United States Patent
Jedrzejewski et al.

(10) Patent No.: US 9,978,283 B2
(45) Date of Patent: May 22, 2018

(54) METHOD AND APPARATUS FOR DYNAMIC TALK GROUP FORMATION AS A FUNCTION OF SUBSCRIBER UNIT MOVEMENT RELATIVE TO A DEFINED INCIDENT LOCATION

(71) Applicant: MOTOROLA SOLUTIONS, INC, Chicago, IL (US)

(72) Inventors: Tomasz Jakub Jedrzejewski, Cracow (PL); Lukasz Wojciech Tutaj, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days. days.

(21) Appl. No.: 15/506,890

(22) PCT Filed: Dec. 16, 2014

(86) PCT No.: PCT/PL2014/000139
§ 371 (c)(1),
(2) Date: Feb. 27, 2017

(87) PCT Pub. No.: WO2016/099299
PCT Pub. Date: Jun. 23, 2016

(65) Prior Publication Data
US 2017/0294131 A1    Oct. 12, 2017

(51) Int. Cl.
*H04W 64/00* (2009.01)
*G08G 1/00* (2006.01)
(Continued)

(52) U.S. Cl.
CPC .............. *G08G 1/207* (2013.01); *H04W 4/08* (2013.01); *H04W 76/005* (2013.01);
(Continued)

(58) Field of Classification Search
CPC ..... H04W 64/00; H04W 76/005; H04W 4/10; H04W 4/08; H04W 84/08; H04W 4/023;
(Continued)

(56) References Cited

U.S. PATENT DOCUMENTS

| 8,260,338 B2 | 9/2012 | Shaffer et al. |
| 8,942,727 B1 * | 1/2015 | Roman ................... H04L 67/18 455/404.2 |

(Continued)

FOREIGN PATENT DOCUMENTS

| GB | 2403622 A | 1/2005 |
| WO | 2001028276 A1 | 4/2001 |

(Continued)

OTHER PUBLICATIONS

The International Search Report and the Written Opinion, corresponding patent application No. PCT/PL2014/0000139, filed: Dec. 16, 2014, all pages.

*Primary Examiner* — Keith Ferguson
(74) *Attorney, Agent, or Firm* — Daniel R. Bestor

(57) ABSTRACT

A process for dynamic talk group formation in a wireless communication system as a function of subscriber unit movement relative to a defined incident location includes receiving, at an infrastructure controller device from one of a third subscriber unit and a dispatch console, a request for forming a new talk group relative to a defined incident location. The infrastructure controller device determines a direction of movement of a plurality of subscriber units relative to the defined incident location. The infrastructure controller device then forms a talk group including a first subscriber unit from the plurality of subscriber units determined to be moving towards the defined incident location (Continued)

and not including a second subscriber unit from the plurality of subscriber units determined to not be moving towards the defined incident location.

20 Claims, 5 Drawing Sheets

(51) Int. Cl.
*H04W 4/08* (2009.01)
*H04W 76/00* (2018.01)
*H04W 4/02* (2018.01)
*H04W 4/04* (2009.01)
*H04W 4/10* (2009.01)
*H04W 4/22* (2009.01)

(52) U.S. Cl.
CPC ............ *H04W 76/45* (2018.02); *H04W 4/027* (2013.01); *H04W 4/046* (2013.01); *H04W 4/10* (2013.01); *H04W 4/22* (2013.01); *H04W 4/90* (2018.02); *H04W 64/006* (2013.01); *H04W 76/002* (2013.01); *H04W 76/007* (2013.01); *H04W 76/40* (2018.02); *H04W 76/50* (2018.02)

(58) Field of Classification Search
CPC ....... H04W 4/02; H04W 4/025; H04W 4/021; H04W 4/027; H04W 48/04; H04W 28/0226; H04W 36/32
USPC ............ 455/518, 519, 500, 517, 416, 404.1, 455/404.2, 521, 445, 422.1, 403, 509, 455/507, 508, 450, 550.1, 426.1, 426.2, 455/456.1–457, 414.1–414.4; 370/310, 370/260, 261, 312, 328, 329, 343
See application file for complete search history.

(56) References Cited

U.S. PATENT DOCUMENTS

| 2004/0198376 | A1* | 10/2004 | Chandhok | H04L 67/04 455/456.1 |
|---|---|---|---|---|
| 2005/0088318 | A1 | 4/2005 | Liu et al. | |
| 2006/0046741 | A1 | 3/2006 | Loesch | |
| 2007/0036118 | A1 | 2/2007 | Shaeffer et al. | |
| 2007/0198168 | A1 | 8/2007 | Nathan | |
| 2007/0202908 | A1 | 8/2007 | Shaffer et al. | |
| 2008/0108339 | A1 | 5/2008 | Shaffer et al. | |
| 2009/0156160 | A1* | 6/2009 | Evans | H04W 4/22 455/404.2 |
| 2010/0194558 | A1 | 8/2010 | Toh et al. | |
| 2010/0311459 | A1* | 12/2010 | Holland | H04W 4/08 455/518 |
| 2011/0009127 | A1* | 1/2011 | Spjuth | H04W 4/02 455/456.1 |
| 2011/0256881 | A1 | 10/2011 | Huang et al. | |
| 2012/0253862 | A1 | 10/2012 | Davidson | |
| 2013/0178233 | A1 | 7/2013 | McCoy et al. | |
| 2014/0038668 | A1 | 2/2014 | Vasavada et al. | |
| 2014/0057645 | A1 | 2/2014 | Chowdhary et al. | |
| 2014/0148135 | A1 | 5/2014 | Haney | |
| 2017/0006449 | A1 | 1/2017 | Igumnov et al. | |

FOREIGN PATENT DOCUMENTS

| WO | 2013101181 A1 | 7/2013 |
|---|---|---|
| WO | 2013184738 A1 | 12/2013 |

* cited by examiner

METHOD AND APPARATUS FOR DYNAMIC TALK GROUP FORMATION AS A FUNCTION OF SUBSCRIBER UNIT MOVEMENT RELATIVE TO A DEFINED INCIDENT LOCATION

This application is a National Stage filing under 35 USC § 371 of co-pending Patent Cooperation Treaty international application having Serial No. PCT/PL14/00139 (the 'PCT international application') filed on Dec. 16, 2014. This application claims priority to the PCT international application, the entire contents of which are incorporated herein by reference.

BACKGROUND OF THE INVENTION

Radio access networks (RANs) provide for radio communication links to be arranged within the network between a plurality of user terminals. Such user terminals may be mobile and may be known as 'mobile stations' or 'subscriber units.' At least one other terminal, e.g. used in conjunction with subscriber units (SUs), may be a fixed terminal, e.g. a base station, eNodeB, repeater, and/or access point. Such a RAN typically includes a system infrastructure that generally includes a network of various fixed terminals, which are in direct radio communication with the SUs. Each of the fixed terminals operating in the RAN may have one or more transceivers which may, for example, serve SUs in a given region or area, known as a 'cell' or 'site', by radio frequency (RF) communication. The SUs that are in direct communication with a particular fixed terminal are said to be served by the fixed terminal. In one example, all radio communications to and from each SU within the RAN are made via respective serving fixed terminals. Sites of neighboring fixed terminals may be offset from one another and may be non-overlapping or partially or fully overlapping with one another. In another example, SUs may communicate within a network without the assistance of one or more infrastructure equipment (e.g., base stations or repeaters), in a mode called direct mode. For example, in direct mode, SUs may transmit asynchronously and SUs within range of the transmission synchronize themselves to that transmission for the purposes of receiving the transmission, but any transmissions in response to or after the first transmission are again transmitted asynchronously.

RANs may operate according to any one of a number of available industry standard protocols such as, for example, an open media alliance (OMA) push to talk (PTT) over cellular (OMA-PoC) standard, a voice over IP (VoIP) standard, or a PTT over IP (PoIP) standard. Typically, protocols such as PoC, VoIP, and PoIP are implemented over broadband RANs including third generation and fourth generation networks such as third generation partnership project (3GPP) Long Term Evolution (LTE) networks.

RANs may additionally or alternatively operate according to an industry standard land mobile radio (LMR) protocol such as, for example, the Project 25 (P25) standard defined by the Association of Public Safety Communications Officials International (APCO), or other radio protocols, the Terrestrial Trunked Radio (TETRA) standard defined by the European Telecommunication Standards Institute (ETSI), the Digital Private Mobile Radio (dPMR) standard also defined by the ETSI, or the Digital Mobile Radio (DMR) standard also defined by the ETSI. Because these systems generally provide lower throughput than the 3GPP and LTE systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocols, among other possibilities. Subscriber units in RANs such as those set forth above send and receive audio and/or data (e.g., digitally encoded voice, audio, video, control or signaling information, and/or audio/video streams) in accordance with the designated protocol.

OMA-PoC, in particular, enables familiar PTT and "instant on" features of traditional half duplex SUs, but uses SUs operating over modern cellular telecommunications networks. Using PoC, SUs such as mobile telephones and notebook computers can function as PTT half-duplex SUs for transmitting and receiving auditory data. Other types of PTT models and multimedia call models (MMCMs) are also available.

Floor control in an OMA-PoC session is generally maintained by a PTT server that controls communications between two or more SUs. When a user of one of the SUs keys a PTT button, a request for permission to speak in the OMA-PoC session is transmitted from the user's SU to the PTT server using, for example, a real-time transport protocol (RTP) message. If no other users are currently speaking in the PoC session, an acceptance message is transmitted back to the user's SU and the user can then speak into a microphone of the SU. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the received auditory data packets to other users of the PoC session (e.g., to other SUs in the group of SUs or talk group to which the user is subscribed), using for example a unicast, multicast, or broadcast communication technique.

Narrowband LMR systems, on the other hand, operate in either a conventional or trunked configuration. In either configuration, a plurality of SUs are partitioned into separate groups of SUs. In a conventional system, each SU in a group is selected to a particular frequency for communications associated with that SU's group. Thus, each group is served by one channel, and multiple groups may share the same single frequency (in which case, in some embodiments, group IDs may be present in the group data to distinguish between groups using the same shared frequency). Communications in a conventional system may take place via an infrastructure-provided repeater or repeaters, or directly via a direct mode (including talk-around) protocol.

In contrast, a trunked radio system and its SUs use a pool of traffic channels for virtually an unlimited number of groups of SUs (e.g., talk groups). Thus, all groups are served by all channels. The trunked radio system works to take advantage of the probability that not all groups need a traffic channel for communication at the same time. When a member of a group requests a call on a control or rest channel on which all of the SUs in the system idle awaiting new call notifications, in one embodiment, a call controller assigns a separate traffic channel for the requested group call, and all group members move from the assigned control or rest channel to the assigned traffic channel for the group call. Communications then take place via the assigned traffic channel repeater. In another embodiment, when a member of a group requests a call on a control or rest channel, the call controller may convert the control or rest channel on which the SUs were idling to a traffic channel for the call, and instruct all SUs that are not participating in the new call to move to a newly assigned control or rest channel selected from the pool of available channels. With a given number of channels, a much greater number of groups can be accommodated in a trunked system as compared with conventional radio systems. In a trunked system, communications may also take place directly between SUs when operating in a talk-around mode (e.g., direct mode when infrastructure devices are also available).

Group calls (i.e., talk group calls) may be made between wireless and/or wireline participants in accordance with either a narrowband or a broadband protocol or standard. Group members (i.e., talk group members) for group calls may be statically or dynamically defined. That is, in a first example, a user or administrator working on behalf of the user may indicate to the switching and/or radio network (perhaps at a radio controller, call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., SUs) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, SUs may dynamically affiliate with a group (and also disassociate with the group) perhaps based on user input, and the switching and/or radio network may track group membership and route new group calls according to the current group membership. In still further examples, an infrastructure controller device in the RAN may dynamically create new groups or amend current groups on request or on its own initiative, and record the members of the new or amended group locally and/or inform the SUs of the member(s) of the new or amended group via over-the-air signaling.

One problem that has arisen with the use of groups to distribute auditory or other data to member SUs is that incidents occur at unexpected locations and unexpected times, and an amount of time required for a dispatcher at a dispatch console to manually locate and form a group of SUs and then dispatch the SUs to the incident is unacceptably long. Accordingly, for this and other reasons, there is a need for an improved method and apparatus for dynamically and automatically forming location-based groups for responding to an incident scene as a function of SU movement relative to the incident scene location.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
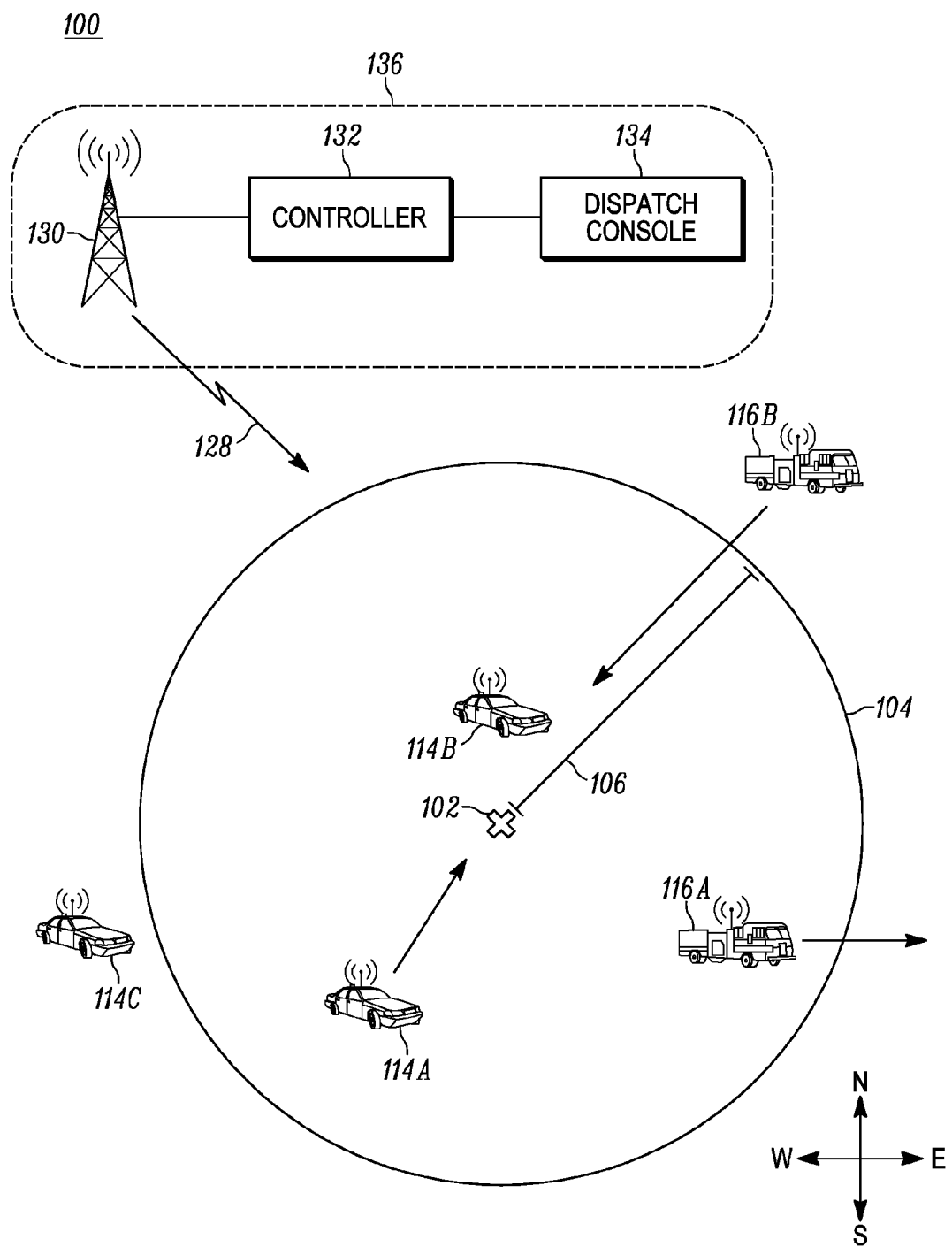
FIG. 1 is a schematic diagram of an existing incident/response area illustrating issues that may arise when creating location-based groups for responding to an incident scene.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method and apparatus for dynamically and automatically forming location-based talk groups for responding to an incident scene as a function of subscriber unit movement relative to the defined incident location.

In one embodiment, a process for dynamic talk group formation in a wireless communication system as a function of subscriber unit movement relative to a defined incident location, the process including: receiving, at an infrastructure controller device from one of a third subscriber unit and a dispatch console, a request for forming a new talk group relative to a defined incident location; determining, by the infrastructure controller device, a direction of movement of a plurality of subscriber units relative to the defined incident location; and forming, by the infrastructure controller device, a talk group including a first subscriber unit from the plurality of subscriber units determined to be moving towards the defined incident location and not including a second subscriber unit from the plurality of subscriber units determined to not be moving towards the defined incident location.

In another embodiment, an infrastructure controller device for dynamic talk group formation in a wireless communication system as a function of a subscriber unit movement relative to a defined incident location comprises: a transceiver; a data store; and one or more processors configured to: receive, via the transceiver, from one of a third subscriber unit and a dispatch console, a request for forming a new talk group relative to a defined incident location; determine a direction of movement of a plurality of subscriber units relative to the defined incident location; and form a talk group including a first subscriber unit from the plurality of subscriber units determined to be moving towards the defined incident location and not including a second subscriber unit from the plurality of subscriber units determined to not be moving towards the defined incident location.

In a still further embodiment, a non-transitory computer readable medium comprises computer-readable instructions that, when executed by a processing device, perform a set of functions, the set of functions comprising: receiving, at the processing device from one of a third subscriber unit and a dispatch console, a request for forming a new talk group relative to a defined incident location; determining, by the processing device, a direction of movement of a plurality of subscriber units relative to the defined incident location; and forming, by the processing device, a talk group including a first subscriber unit from the plurality of subscriber units determined to be moving towards the defined incident location and not including a second subscriber unit from the plurality of subscriber units determined to not be moving towards the defined incident location.

Each of the above-mentioned embodiments will be discussed in more detail below, starting with an example conventional incident/response area schematic diagram and then incident/response area schematic diagrams of areas in which the embodiments may be practiced, followed by an illustration of devices and processing steps for supporting automatic dynamic formation of location-based groups for responding to an incident scene as a function of subscriber unit movement relative to the defined incident location. Further advantages and features consistent with this disclosure will be set forth in the following detailed description, with reference to the figures.

1. EXAMPLE INCIDENT/RESPONSE AREAS AND LOCATION-BASED TALK GROUP FORMATION FOR RESPONDING TO AN INCIDENT SCENE AS A FUNCTION OF SUBSCRIBER UNIT MOVEMENT RELATIVE TO THE DEFINED INCIDENT LOCATION

FIG. 1 illustrates an example conventional method of automatic talk group formation based on location. Such an existing method of automatically creating a location-based talk group relies upon a pre-configured static distance from a defined location (such as the location of the criminal action or injury) to determine which responding personnel (e.g., via their corresponding assigned subscriber units (SUs)) should be included in the location-based talk group.

For example, as shown in FIG. 1, an incident/response area 100 may include an incident scene at defined incident location 102. The defined incident location 102 may be associated with, for example, a location of a reported robbery, a location of a medical emergency, or a location of a security alert, among other possibilities. The defined incident location 102 may be reported by a responder on scene or set by a dispatcher at a dispatch console 134, and, as is known, may be assigned a response boundary 104 statically defined at a fixed distance 106 from the defined incident location 102. Various potential responding SUs (each of which may also already be a member of a corresponding first responder talk group, such as a police, fire, or traffic control talk group) may already be on scene or within the response boundary 104 at the time of the incident or request for formation of the talk group. Each potential responder may be a person or vehicle with an associated SU (e.g., portable or vehicular SU) capable of communicating wirelessly with each other and/or with a RAN 136. Such potential responding SUs located within the response boundary 104 may include, for example, a first police motor vehicle potential responding SU 114A, a second police motor vehicle potential responding SU 114B, and a first fire motor vehicle potential responding SU 116A. Other potential responding SUs located within incident/response area 100 but outside of the response boundary 104 include a third police motor vehicle potential responding SU 114C and a second fire motor vehicle potential responding SU 116B. Although motor vehicle SUs are used throughout the examples set forth in the figures, it should be understood that other types of SUs having different modes of transportation could be used as well. For example, pedestrians, aquatic vehicles, bicycles, or flying vehicles, among others, could be used in place of or in addition to the motor vehicles set forth in the figures.

Each of the potential responding SUs may, in one example, already be actively using RF resources 128 of the RAN 136, which may be an LMR or LTE RAN providing coverage substantially throughout the incident/response area 100, illustrated in FIG. 1 as including a single fixed terminal 130 coupled to an infrastructure controller device 132 (e.g., radio controller, call controller, PTT server, zone controller, MME, BSC, MSC, site controller, Push-to-Talk controller, or other network device) and via the controller 132, to dispatch console 134.

As illustrated in FIG. 1, using the statically defined response boundary 104 to dynamically set a location-based talk group membership for an incident or response required at or near the defined incident location 102 causes some potential responding SUs (such as first fire motor vehicle potential responding SU 116A) to be included in the location-based talk group even though they are moving away from the defined incident location 102 and about to cross out of the defined response boundary 104, and also causes potential responding SUs (such as first second fire motor vehicle potential responding SU 116B) to not be included in the location-based talk group even though they are moving towards the defined incident location 102 and about to cross into the defined response boundary 104.

Figure 2:
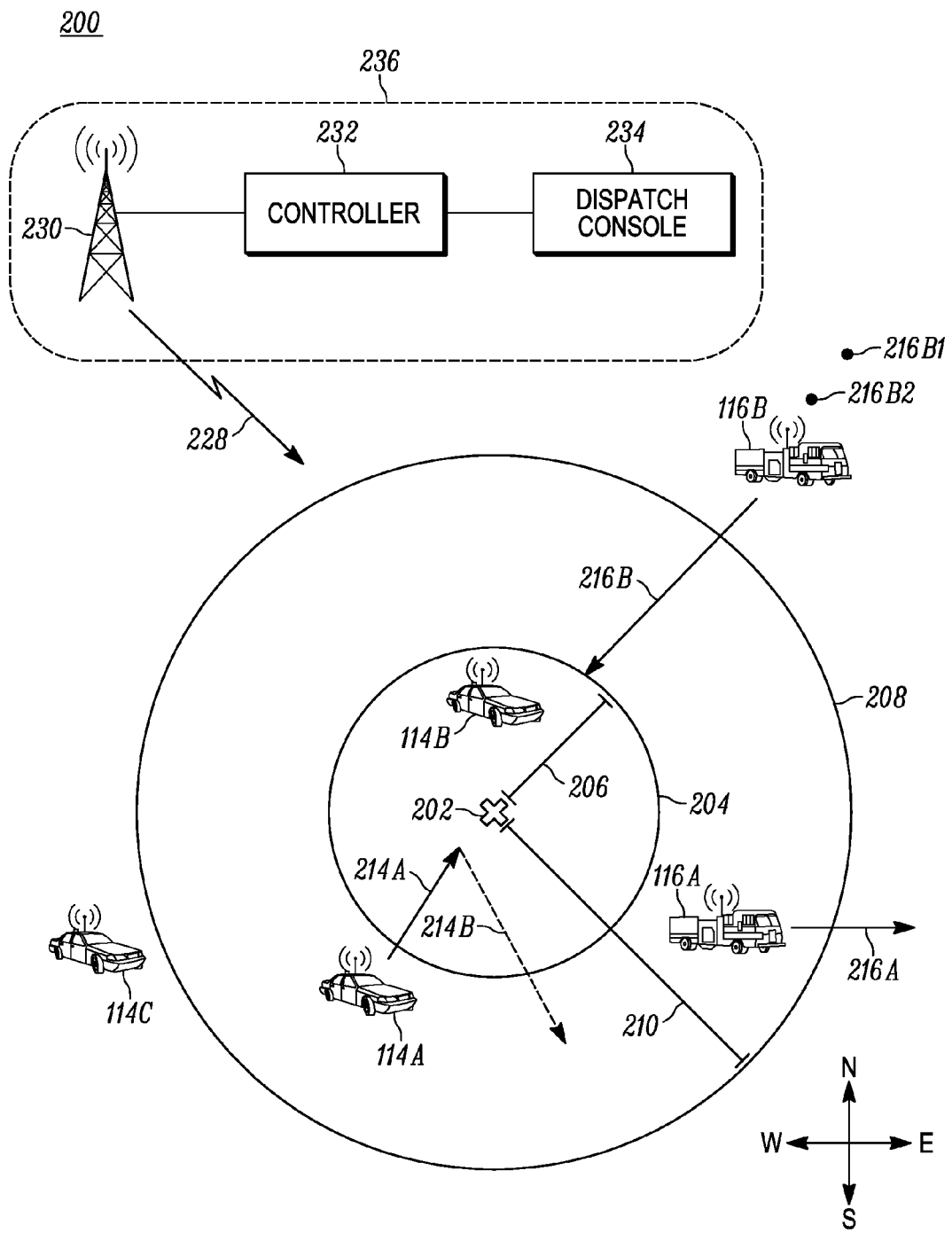
FIG. 2 is a schematic diagram of a first incident/response area illustrating dynamic group formation as a function of subscriber unit movement relative to a defined incident location in accordance with an embodiment.
Figure 3:
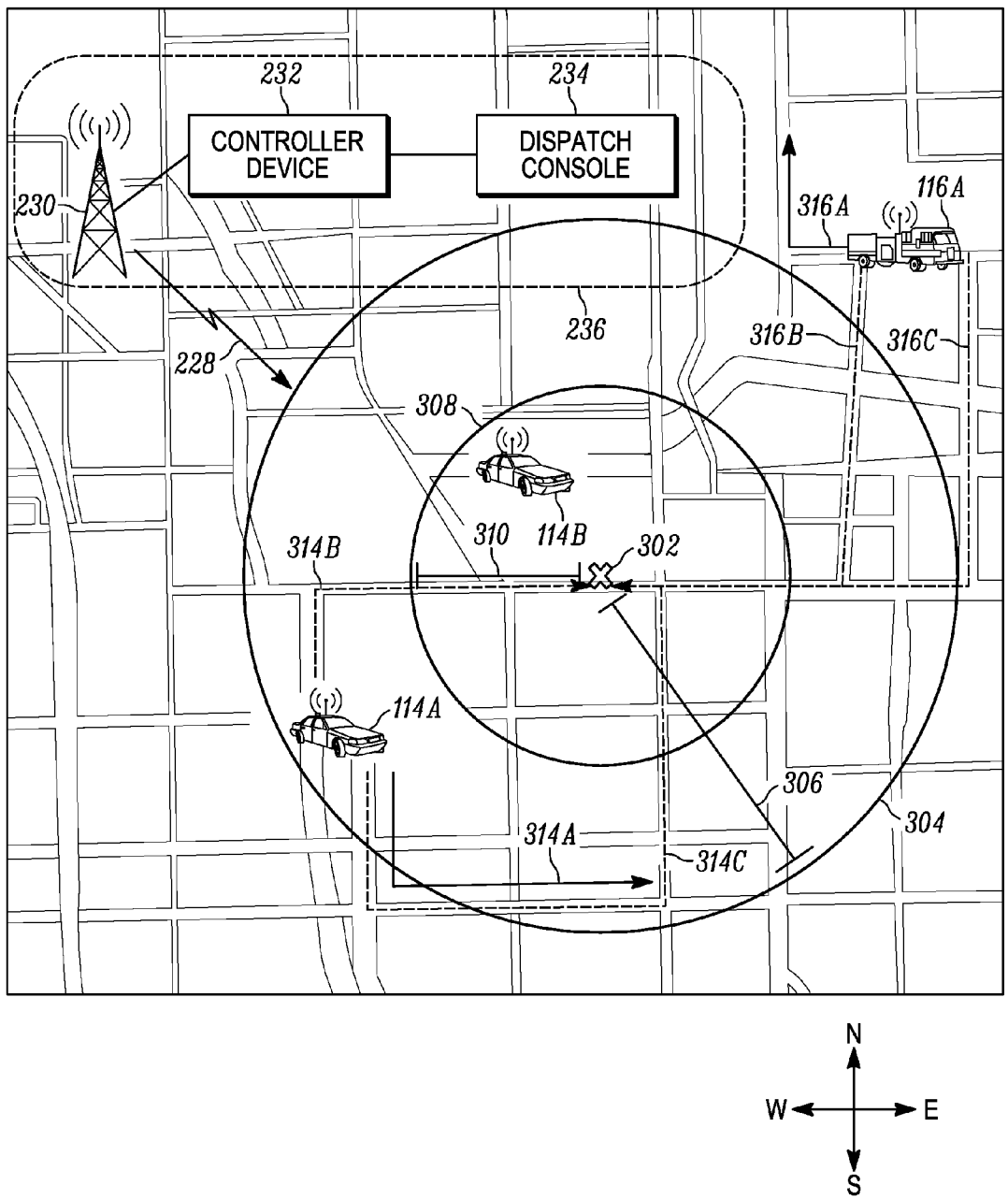
FIG. 3 is a schematic diagram of a second incident/response area illustrating dynamic group formation as a function of subscriber unit movement relative to a defined incident location in accordance with an embodiment.

FIGS. 2 and 3 are schematic diagrams of first and second incident/response areas illustrating dynamic and automatic formation of location-based talk groups for responding to an incident scene as a function of SU movement relative to the defined incident location. Where similar reference characters are used across FIGS. 1, 2, and 3, their description is not repeated, but is intended to equally apply to the other figures in which they appear. While FIGS. 2 and 3 illustrate a single radio access network (RAN), single fixed terminal, single radio-frequency (RF) resource, a particular arrangement and quantity of defined incident locations, and a particular arrangement, quantity, movement direction, and types of potential responders (and their associated SUs), such illustrations are exemplary in nature only, and in other embodiments, different arrangements, quantities of elements, and movement directions may be employed.

FIG. 2, in particular, illustrates an example first incident/response area 200 including a RAN 236, a defined incident location 202 associated with an incident scene, and a plurality of potential responding SUs 114A, 114B, 114C, 116A, and 116B. The incident scene may again, for example, be associated with a location of a reported robbery, a location of a medical emergency, or a location of a security alert, among other possibilities. The defined incident location 202 may be identified as one or more of a street address, an intersection, a global positioning system (GPS) location, an elevation, a triangulated location, an identity (hardware address, IP address, network identifier, etc.) of a fixed wireless transmitting device (e.g., base station, access point, wireless beaconing device, other mobile station, etc.), a uniquely identified structure (such as a particular subway, train line, road, or building), a uniquely identified user or vehicle (e.g., separately tracked by the infrastructure controller device 232 by user identifier or vehicle identifier), a building floor, or some other form of unique location identifier. In some embodiments, the defined incident location 202 is a static location, such as a street address or GPS location, while in other embodiments, the defined incident location 202 may be mobile, such a s a uniquely identified user or vehicle.

RAN 236 may be an LMR or LTE RAN providing coverage substantially throughout the incident/response area 200 via RF resources 228, and is illustrated in FIG. 2 as including a single fixed terminal 230 coupled to an infrastructure controller device 232 (e.g., radio controller, call controller, PTT server, zone controller, MME, BSC, MSC, site controller, Push-to-Talk controller, or other network device) and further coupled, via the infrastructure controller device 232, to a dispatch console 234.

The RF resource 228 may include, for example, one or more wireless links supporting a standard or protocol such as GPRS or UMTS, 2G (e.g. GSM), 3G (e.g. WCDMA or Long Term Evolution (LTE)), 4G (WiMAX or LTE), iDEN, wireless LAN (WLAN), ETSI Digital Mobile Radio (DMR), Project 25 (P25) standard defined by the Association of Public Safety Communications Officials International (APCO), Terrestrial Trunked Radio (TETRA), or other radio protocols or standards.

Each potential responding SU 114A, 114B, 114C, 116A, 116B may be a group communications device, such as a push-to-talk (PTT) device, that is normally maintained in a monitor only mode, and which switches to a transmit-only mode (for half-duplex devices) or transmit and receive mode (for full-duplex devices) upon depression or activation of a PTT input switch. The group communications architecture provided via RAN 236 allows a single SU, such as SU 114A, to communicate with one or more members associated with a dynamically formed talk group at the same time.

Although only one infrastructure controller device 232 is illustrated in FIG. 2, a distributed controller may be used that divides functions across multiple devices, perhaps for load balancing reasons. Infrastructure controller device 232 may additionally function as a call controller, PTT server, zone controller, mobile management entity (MME), base station controller (BSC), mobile switching center (MSC), site controller, Push-to-Talk controller, or other network device for aiding in the control and/or distribution of group auditory data or other types of group communications amongst responding SUs. Finally, and although not illustrated in FIG. 2, RAN 236 may further comprise one or more additional routers, switches, LANs, WLANs, WANs, fixed terminals, access points, or other network infrastructure.

External networks (not shown) may also be accessible to potential responding SUs 114A, 114B, 114C, 116A, 116B and to dispatch console 234 via RAN 236. External networks may include, for example, a public switched telephone network (PSTN), a plain old telephone system (POTS), the Internet, or another wireless service provider's network, among other possibilities.

Dispatch console 234 may be directly coupled to infrastructure controller device 232, as shown, or may be indirectly coupled to infrastructure controller device 232 via one or more internal or externals networks. The dispatch console 234 allows an administrator or dispatcher at the dispatch console 234 to initiate infrastructure-sourced location-based group communications to groups of SUs relative to a defined incident indicated by the dispatcher, and to participate in group communications sourced by other SUs, among other features and functions.

The defined incident location 202 of the incident scene is provided to the infrastructure controller device 232 and may be entered in (via a user interface) or reported automatically (e.g., via reported GPS or triangulated location) or manually (e.g., via over-the-air communicated speech) by a first responder on-scene (for example, motor vehicle potential responding SU 114A in FIG. 2), could be automatically determined by a determined location of some other responding SU (identified by an initiating SU or by the dispatcher) that is at the defined incident location 202 (not illustrated in FIG. 2), could be automatically provided to infrastructure controller device 232 by a location-enabled reporting or alerting device in response to a triggering event, or could be set by the dispatcher at the dispatch console 234 communicatively coupled to the infrastructure controller device 232 (e.g., after receiving a report from a SU or via some other mechanism, such as a POTS system call received at the dispatch console 234), among other possibilities. In still further embodiments, a plurality of fixed terminals (not shown) in the RAN 236 may be used to determine a location, by the infrastructure and using triangulation of a signal emitted from a SU or alerting device as set forth above. Other possibilities exist as well.

In addition to the defined incident location 202 of the incident scene, indication(s) of a direction of travel (and, in some embodiments, a speed) of each of the SUs 114A, 114B, 114C, 116A, 116B is tracked by, and/or is provided to or made accessible to, the infrastructure controller device 232. For example, a direction of travel of each SU may be entered into the device by an associated user and reported to the infrastructure controller device 232 or may be reported manually (e.g., by voice) by an associated user and entered into and subsequently provided to the infrastructure controller device 232 via a dispatcher at the dispatch console 234. In other embodiments, movement sensors (such as an accelerometer, magnetometer, and/or gyroscope) may be provided at each SU, and sensor information periodically or intermittently provided to the infrastructure controller device 232 as indications of direction (and/or speed), perhaps accompanying other additional information, allowing the infrastructure controller device 232 to determine the direction (and/or speed) of movement of the SU. An accelerometer is a device that measures acceleration. Single- and multi-axis models are available to detect magnitude and direction of the acceleration as a vector quantity, and can be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and can be used to determine a direction in which a person or device is facing. Other types of movement sensors could additionally, or alternatively, be used as well.

In other examples, the indication of direction (and/or speed) of travel of each SU could be provided to the infrastructure controller device 232 in the form of a plurality of reported sequential GPS locations or triangulated positions of a SU (from which the infrastructure controller device 232 may extract and/or determine direction information via a best-fit line and may extract and/or determine speed information using a time difference between the reported locations, such as by time difference of receipt of location messages or time difference in time stamps of the SU location determinations). In still further embodiments, a plurality of fixed terminals in the RAN 236 may be used to determine a plurality of locations, by the infrastructure and using triangulation of a signal emitted from each SU, from which the infrastructure controller device 232 may similarly extract and/or determine direction and/or speed information. In some embodiments, an initial location and a single subsequent location of the SU may be sufficient for the infrastructure controller device 232 to determine a speed and/or direction of travel of the SU. In other embodiments, a minimum threshold plurality of locations (e.g., more than two) of each SU may be obtained prior to estimating a speed and/or direction of travel of the SU.

The infrastructure controller device 232 may determine or have access to current and/or historical location information for all potential responding SUs active and/or known to the infrastructure controller device 232, a subset of all potential responding SUs active and/or known to the infrastructure controller device 232 including those currently registered with one or more RANs providing wireless service at or near the defined incident location, such as within 1-5 miles thereof, a subset of all potential responding SUs active and/or known to the infrastructure controller device 232 including only those that are not already active in another call or otherwise determined to be busy, for example, or a subset of all potential responding SUs active and/or known to the infrastructure controller device 232 that are particularly identified as available for participating in dynamically created location-based talk groups, among other possibilities.

As just one example of the foregoing, SU 116B may report a plurality of locations 216B1 and 216B2, based on which the infrastructure controller device 232 may determine a direction of movement for SU 116B indicated via the arrow 216B (where the angle of the arrow indicates a south-westerly direction). In some embodiments, the infrastructure controller device 232 may further determine a speed of movement for SU 116B, and arrow 216B may be a vector (whose length indicates an average or instantaneous speed of SU 116B). Similar or different methods of determining direction and/or speed may be applied for SUs 114A and 116A, resulting in corresponding arrows 214A and 216A indicative of a direction and/or speed of SUs 114A and 116A. SUs 114B and 114C are stationary, and thus are illustrated in FIG. 2 without a corresponding arrow.

Once the infrastructure controller device 232 has information including the defined incident location 202 of the incident scene and an indication of a speed and/or direction of movement of the SUs, the infrastructure controller device 232 determines whether each SU is moving towards or away from the defined incident location 202 associated with the incident scene.

In one example, the infrastructure controller device 232 may be preconfigured to apply a threshold area or zone around the defined incident location 202 and determine whether a SU's current (instantaneous) direction of travel or average direction of travel determined over a plurality of reported locations would intersect with that threshold area or zone. The area or zone may be a circular area 204 set at a predetermined distance 206 from the defined incident location 202. SUs determined to be moving towards the defined incident location 202 are those having a direction of travel that intersects the circular area 204 (in this case, SUs 114A and 116B). Depending on system configuration, stationary vehicles such as SU 114B may be included as being within the defined incident location 202 and thus designated as "moving towards" the defined incident location 202, or may classified as "moving away" from the defined incident location 202 as they are not moving towards the defined incident location 202. While in this example a circular area 204 is used as the threshold area or zone, in other embodiments, any geometric definition or shape could be used having different distance parameters, and in some embodiments, polygonal geo-fence definitions could be used as well. In other embodiments, the infrastructure controller device 232 may calculate an angular difference between the arrow or vector associated with the determined direction of the SU (e.g., arrow 216B) and a calculated arrow or vector that points directly from the SU to the defined incident location 202, and determine that the SU is moving towards the defined location 202 if the angular difference is less than a maximum threshold angular difference, such as 30°, 60°, or 90°. Other methods of determining whether a SU is moving towards a defined incident location 202 associated with an incident or moving away from the defined incident location 202 could be used as well.

In still further embodiments, and as illustrated in FIG. 2, an outer threshold area or zone 208 may be defined relative to the defined incident location 202 and outside of the inner threshold area or zone 204, such as at a predetermined distance 210 from the defined incident location 202. Within the inner threshold area 204, SUs may be included in a location-based talk group regardless of their direction of travel, while SUs outside of the outer threshold area 208 may not be included in a location-based talk group associated with the defined incident location 202 regardless of their direction of travel. Between the inner threshold area 204 and the outer threshold area 208, the infrastructure controller device 232 may include or exclude any particular SU dependent on whether it is determined to be moving towards or moving away from the defined incident location 202.

In some embodiments, a direction of travel of the SUs 114A, 114B, 114C, 116A, 116B may be determined by the infrastructure controller device 232 for the purposes of forming a talk group only at the time of formation of the talk group (e.g., in response to a request or alert), and once the talk group is created as a function of a direction of travel of the SUs, the talkgroup is not further modified. In other embodiments, the infrastructure controller device 232 may continue to track directions of travel of the SUs 114A, 114B, 114C, 116A, 116B and, in response to determining that a SU that was previously moving towards the defined incident location 202 (e.g., SU 114A via arrow 214A) has now turned away so that it is no longer moving towards the defined incident location 202 (e.g., SU 114A via arrow 214B), the infrastructure controller device 232 may remove the SU 114A from the formed talk group.

In still further embodiments, the SUs identified by the infrastructure controller device 232 as moving towards the incident scene may not be automatically added to the location-based talk group for responding to the incident, but instead, the infrastructure controller device 232 may transmit dispatch invitations to each of the indentified SUs asking them to join the talk group and respond to the incident. Only those SUs transmitting a positive reply in response to the invitation are then added to the location-based talk group for responding to the incident by the infrastructure controller device 232.

In addition to determining whether a SU is moving towards or away from the defined incident location 202 associated with the incident scene, the infrastructure controller device 232 may identify a set of one or more additional inclusion threshold rules for forming the location-based talkgroup for responding to the defined incident location 202. Same or different sets of additional inclusion threshold rules could be applied to each SU, based on parameters such as type of SU, time of day, location of SU, type of incident, etc.

For example, and slightly different than the multiple circular area embodiment set forth above, an additional inclusion threshold rule may identify potential responding SUs having current locations that fall within a maximum response distance associated with and relative to the defined incident location 202. Same or different maximum response distances may be associated with each of the SUs dependent on parameters such as type of SU, time of day, location of SU, type of incident, etc. For example, the infrastructure controller device 232 may apply a maximum response distance equal to predetermined distances 206 or 210, and only determine whether SUs are moving towards or away from the defined incident location 202 if they are currently located within the respective predetermined distance. While each of the predetermined distances 206, 210 are illustrated as associated with circular areas 204, 208, respectively, in other embodiments, the predetermined distances within which the infrastructure controller device 232 will look for SUs for responding to the defined incident location 202 may take some other form of cartographic definition, such as a set of three or more polygon vertices, where each polygon vertex is a GPS coordinate, such as a latitude and longitude pair, or some other form of cartographic definition, having a center at the defined incident location 202 or slightly offset from the defined incident location 202. Other examples are possible as well.

In other embodiments, the additional inclusion threshold rule may identify particular types of SUs, perhaps as a function of the type of incident occurring at the defined incident location 202, and only determine whether SUs fitting the identified particular types of SUs are moving towards or away from the defined incident location 202. Other additional inclusion threshold rules may include an agency that a SU or its user belongs to, a jurisdictional boundary or border, specialized equipment available to or associated with a SU, and a predicted time of arrival to reach the defined incident location 202, among other possibilities.

Still further, in some embodiments, the additional inclusion threshold rule may identify which SUs could arrive at the defined incident location 202 within a threshold period of time, perhaps taking into account a type of transportation associated with the SU (e.g., pedestrian, scooter, motor vehicle, etc.), paths available to the SU (e.g., using cartographic information from a geographic information system (GIS)), and one or more other parameters. The reshold period of time may be, for example, 5, 10, 15, or 30 minutes. Such additional inclusion threshold rules may be pre-configured in the RAN or may be specified in the request for the location-based talk group.

FIG. 3 illustrates an example second incident/response area 300 including RAN 236, defined incident location 302 associated with an incident scene, and the plurality of potential responding SUs 114A, 114B, and 116A.

FIG. 3, in particular, illustrates a variation of automatic formation of location-based talk groups for responding to an incident scene as a function of SU movement relative to the defined incident location when the infrastructure controller device 232 has access to cartographic information from a cartographic database describing paths available to the SUs. The cartographic database may be stored at the infrastructure controller device 232 or at a GIS, accessible to the infrastructure controller device 232, and that is pre-configured with available motor vehicle paths, pedestrian paths, aquatic paths, flight paths, and/or other types of paths within incident/response area 300. When available, the infrastructure controller device 232 may use such cartographic information in estimating a shortest (e.g., in total miles) or quickest (e.g., in time) path for each SU from its current location or a previous location to the defined incident location 302.

As one example, FIG. 3 illustrates SU 114A at a current or past location and illustrates several routes 314B, 314C representing possible shortest and/or quickest routes from the current or past location to the defined incident location 302. The possible paths 314B, 314C may have been calculated by the infrastructure controller device 232 with reference to path information from the GIS, or may have been provided to the infrastructure controller device 232 by the GIS in response to the infrastructure controller device 232 providing the GIS with the current or past location of the SU 114A and the defined incident location 312. The path 314A in FIG. 3 represents future or more recent locations of the SU 114A. As shown, while at some point in path 314A the SU 114A is moving south in a direction "away from" the defined incident location 302 when viewed solely based on cardinal direction of the SU 114A relative to the defined incident location 302, having access to cartographic information allows the infrastructure controller device 232 to determine that the SU 114A is moving along one of a threshold number of quickest and/or shortest paths towards the defined incident location 302, and thus can still be considered to be "moving towards" the defined incident location 302 as long as it continues along the calculated path or paths.

In contrast, FIG. 3 also illustrates SU 116A at a current or past location and illustrates several possible paths 316B, 316C representing shortest and/or quickest routes from the current or past location to the defined incident location 302. The path 316A represents future or more recent locations of the SU 116A calculated or obtained at the infrastructure controller device. As shown, while at some point in path 316A the SU 116A is moving south in a direction "towards" the defined incident location 302 when viewed solely based on cardinal direction of the SU 116A relative to the defined incident location 302, having access to cartographic information allows the infrastructure controller device 232 to determine that the SU 116A is not moving along one of the threshold number of quickest and/or shortest paths towards the defined incident location 302, and thus can be considered to be "moving away" from the defined incident location 302. SU 114B is stationary and may be labeled as "moving away" or "moving towards" the defined incident location 302 based on similar considerations as set forth above with SU 114B in FIG. 2. Furthermore, similar considerations of SU location within an inner threshold area 308 (at distance 310) or outer threshold area 304 (at distance 306), or SU location outside of outer circular area 304, may be applied in a similar manner as set forth above with respect to areas 204 and 208 in FIG. 2.

Additional inclusion threshold rules as set forth above with respect to FIG. 2 may be similarly applied to the arrangement of FIG. 3. In particular, and for example, the infrastructure controller device 232 may further take cartographic information retrieved from the GIS system into account in determining paths 314B, 314C, 316B, 316C and use expected time of arrival information to further limit the SUs to add to the location-based group for responding to the incident scene as a function of SU movement relative to the defined incident location. For example, a preconfigured maximum threshold time of arrival parameter may be applied as an additional inclusion threshold rule, and any SU having an expected time of arrival greater than 1, 5, 10, or 15 minutes may not be included or may not be considered by the infrastructure controller device 232 for inclusion in the talk group.

As one variation on the foregoing, in some embodiments, mode of transport information (e.g, such as motor vehicle, cycle, pedestrian, boat, plane, etc.) may be obtained by the infrastructure controller device 232 via a potential responding SU ID to mode of transport mapping stored at the infrastructure controller device 232 or made available to the infrastructure controller device at some other device located within the RAN 236 or external to the RAN 236. After the mode of transport information is retrieved for each of the SUs, average or maximum speed capability information associated with each mode of transport may be retrieved via a mode of transport to speed mapping. Once the speed capability information and current location information is known for a potential responding SU, the infrastructure controller device 232 can determine an estimated arrival time for each SU to the defined incident location for use in determining whether the SU meets the arrival-time-based inclusion threshold rule for the incident.

In some embodiments, updates to a mode of transport may be received at the infrastructure controller device 232 from a SU that changes a mode of transport associated with the SU from one mode of transport to another different mode of transport. This may occur when, for example, an officer presently on foot and carrying a SU enters a police car. The infrastructure controller device 232 may responsively update the mapping at the infrastructure controller device 232 itself or cause an update to be made at some other device located within the same RAN 236 as the infrastructure controller device or at some device external to the RAN 236 that stores the SU ID to mode of transport mapping for the SU.

Furthermore, in calculating or otherwise determining arrival time estimates or quickest paths to arrive at the defined incident location 302, the infrastructure controller device 232 may access additional information databases to aid in more accurately estimating such arrival times. For example, infrastructure controller device 232 may access current traffic conditions via a traffic server and modify the arrival time estimates or quickest paths for the SUs based on a respectively higher or lower detected amount of traffic within a particular incident/response area 300 or on a particular possible path. Additionally or alternatively, the infrastructure controller device 232 may access weather conditions via a weather server and modify the arrival time estimates up or down based on the weather conditions retrieved from the weather server that may positively or negatively affect a speed that a pedestrian or vehicle could achieve (e.g., such as snow or icy conditions). A determined time of day, determined at the infrastructure controller device 232 or via an external time server device, may also cause estimated arrival times to vary (e.g., decrease during the day and increase at night, for example). Other examples are possible as well.

Of course, the infrastructure controller device 232, since it already has access to current and most likely one or more historical locations for each SU, along with timestamps associated with when each location was determined, may be able to determine a unique average velocity value for each SU and apply the average velocity value to the determined available cartographic paths to obtain a time of arrival for each SU. Other possibilities exist as well.

2. EXAMPLE INFRASTRUCTURE CONTROLLER DEVICE FOR CREATING DYNAMIC LOCATION-BASED GROUPS

Figure 4:
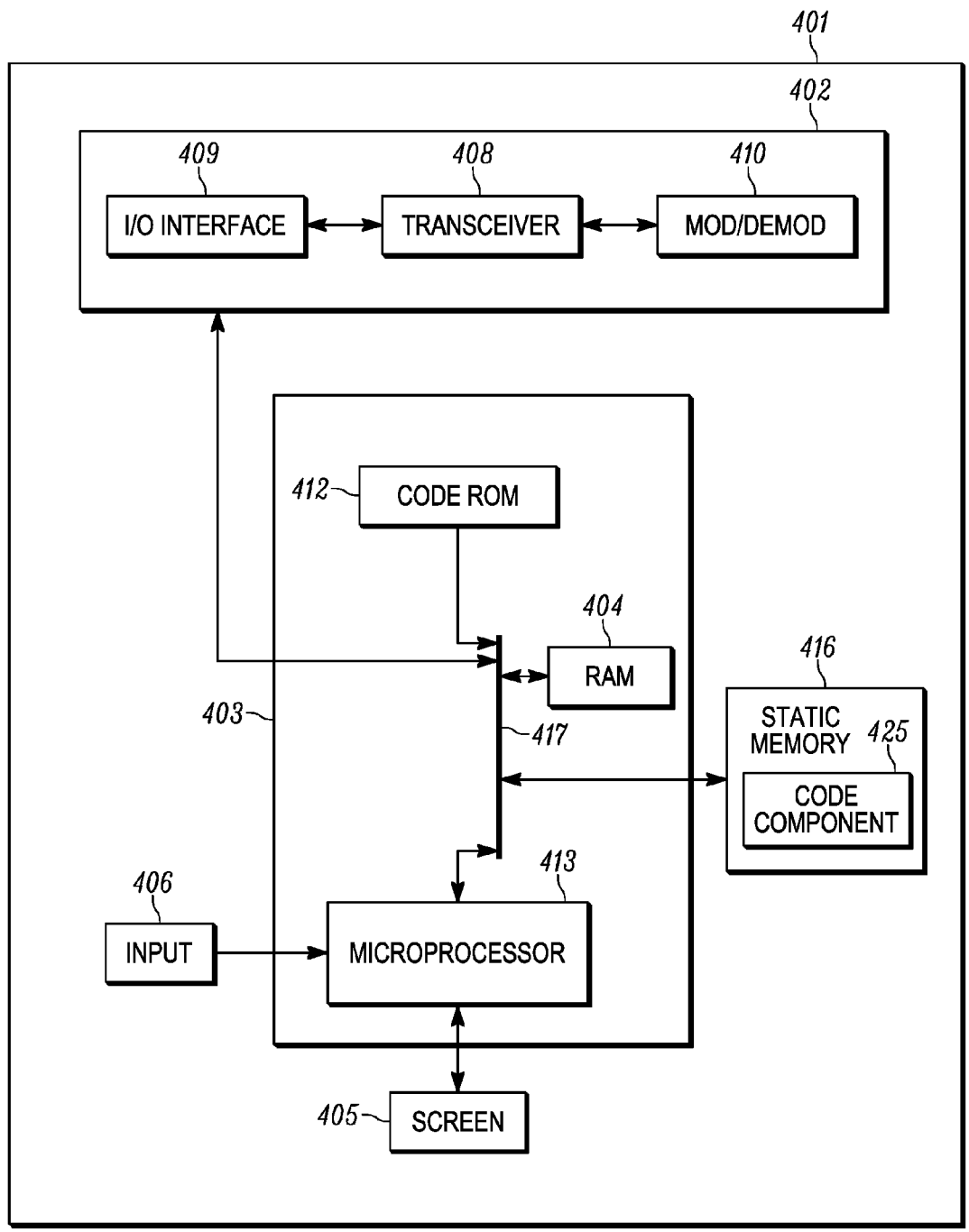
FIG. 4 is a block diagram of an infrastructure controller device capable of dynamic group formation as a function of subscriber unit movement relative to a defined incident location in accordance with an embodiment.

Referring to FIG. 4, a block diagram illustrates an infrastructure controller device 401 that may be the same or similar to infrastructure controller device 232 of FIGS. 2 and 3, and that may be used in accordance with some embodiments for automatically forming location-based talk groups for responding to an incident scene as a function of SU movement relative to the defined incident location. The infrastructure controller device 401 includes a communications unit 402 coupled to a common data and address bus 417 of a processing unit 403. The controller 401 may also include an input unit (e.g., keypad, pointing device, etc.) 406 and a display screen 405, each coupled to be in communication with the processing unit 403.

The processing unit 403 may include a code Read Only Memory (ROM) 412 coupled to the common data and address bus 417 for storing data for initializing system components. The processing unit 403 may further include a microprocessor 413 coupled, by the common data and address bus 417, to a Random Access Memory (RAM) 404 and a static memory 416. The processing unit 403 may also have access to, via one or both of RAM 404 and static memory 416 or via I/O interface 409, among other things, (i) cartographic information relating to geographic areas in an incident/response area associated with the controller 401, (ii) distance and/or time criterions for applying distance or time-based inclusion threshold rules, (iii) traffic condition information, (iv) weather condition information, and/or (v) current and/or historical location information for each SU in the incident/response area associated with the infrastructure controller device 401.

The communications unit 402 may include the I/O interface 409 configurable to communicate with network components (for example, fixed terminals, call controllers, databases, or dispatch consoles, among other possibilities), and other user equipment (for example, SUs) communicatively coupled to the infrastructure controller device 401 via wireless resources. The communications unit 402 may include one or more broadband and/or narrowband transceivers 408, such as a LTE transceiver, a 3G transceiver, an APCO P25 transceiver, a DMR transceiver, a TETRA transceiver, a WiMAX transceiver, and/or other similar types of wireless transceivers configurable to communicate via a wireless network for infrastructure communications. Additionally or alternatively, the communications unit 402 may include one or more local area network or personal area network transceivers 408 such as a Wi-Fi transceiver perhaps operating in accordance with an IEEE 802.11 standard (e.g., 802.11a, 802.11b, 802.11g), or a Bluetooth transceiver, for SD to SD communications. Furthermore, the communications unit 402 may include one or more wire-line transceivers 408, such as an Ethernet transceiver, a Universal Serial Bus (USB) transceiver, or similar transceiver configurable to communicate via a twisted pair wire, a coaxial cable, a fiber-optic link or a similar physical connection to a wire-lined network.

The transceivers may be coupled to a combined modulator/demodulator 410. The microprocessor 413 has ports for coupling to the input unit 406 and to the display screen 405.

Figure 5:
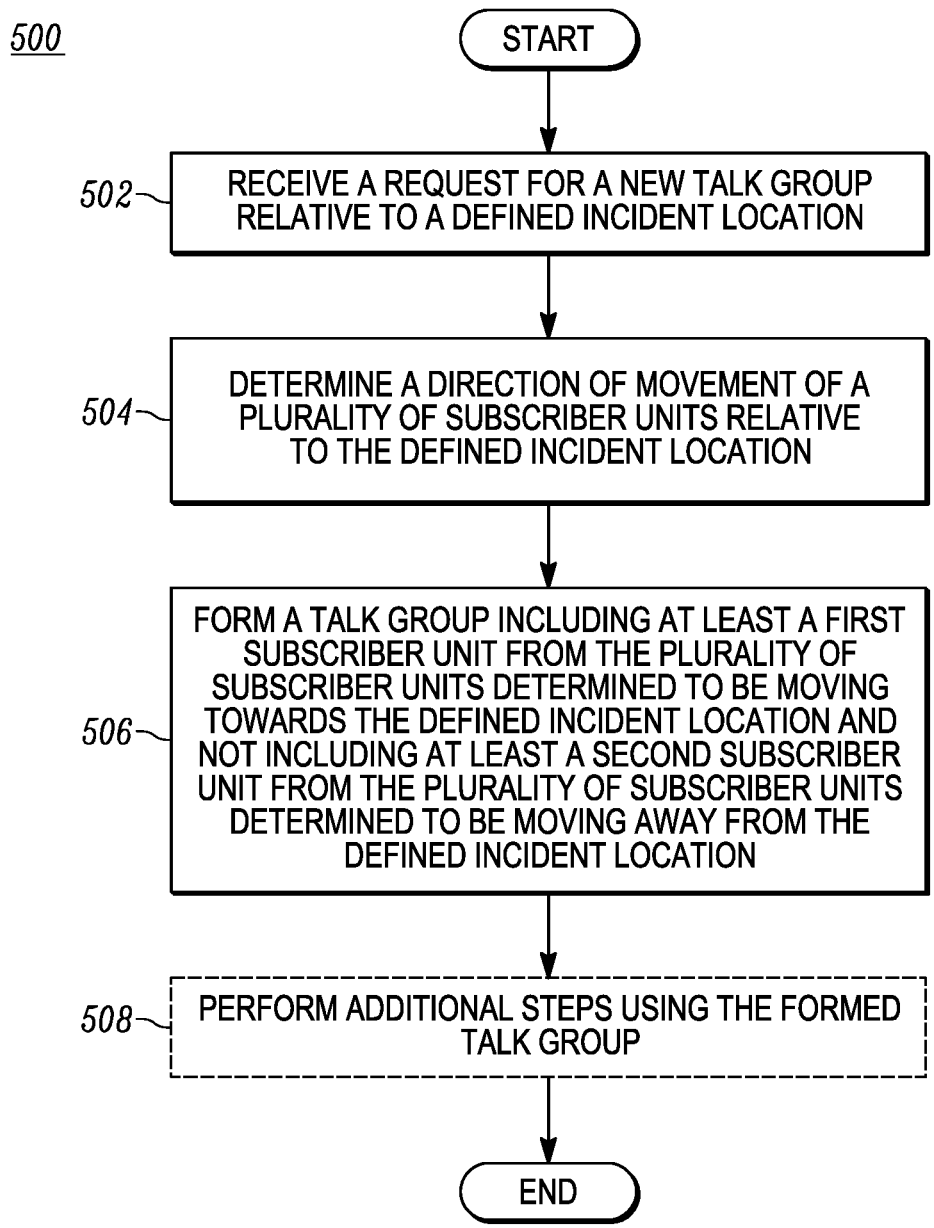
FIG. 5 is a flow chart illustrating processing steps executable at the infrastructure controller devices of FIGS. 2, 3, and/or 4 for dynamic group formation as a function of subscriber unit movement relative to a defined incident location in accordance with an embodiment.

Static memory 416 may store operating code as code component 425 for the microprocessor 413 that, when executed, performs one or more of the steps set forth in FIG. 5 and accompanying text. Static memory 416 may also store, permanently or temporarily, talk group subscription information that, for each talk group identifier associated with a particular group of SUs, identifies SUs that are members of the particular talk group. Other types of information could be tracked and/or stored in static memory 416 as well.

Static memory 416 may comprise, for example, a harddisk drive (HDD), an optical disk drive such as a compact disk (CD) drive or digital versatile disk (DVD) drive, a solid state drive (SSD), a tape drive, a flash memory drive, or a tape drive, to name a few.

3. PROCESS FOR CREATING DYNAMIC LOCATION-BASED TALK GROUPS FOR RESPONDING TO AN INCIDENT SCENE AS A FUNCTION OF SUBSCRIBER UNIT MOVEMENT RELATIVE TO THE DEFINED INCIDENT LOCATION

FIG. 5 includes a flow chart illustrating a process 500 including processing steps executable at the infrastructure controller device 401 device of FIG. 4 and/or infrastructure controller device 232 of FIGS. 2 and/or 3 for forming location-based talk groups for responding to an incident scene as a function of SU movement relative to the defined incident location. Of course, additional steps, receptions, and/or transmissions not disclosed herein could be additionally added before, after, or in-between steps disclosed in FIG. 5, and the presence of such additional steps would not negate the purpose and advantages of the examples set forth in detail throughout the remainder of this disclosure.

At step 502, an infrastructure controller device in a RAN receives a request for a new talk group relative to a defined incident location (e.g., from one of a SU and a dispatch console). The request may be a request for a dynamic regroup of existing SUs and/or talk groups, the addition of SUs to an existing talk group to form a new talk group, the creation of an entirely new talk group that previously did not exist, or a request for a new talk group call, among other possibilities. Before, during, or after step 502, the infrastructure controller device tracks, or has access to a device that tracks, SU location(s) and/or SU direction information. In some embodiments, the request may include or indicate the defined incident location, while in other embodiments, the location of the incident may be signaled separately.

The defined incident location may be a same location as the requesting device (e.g., requesting SU), may be a location manually entered by an operator of the requesting device (e.g., first potential responding SU or dispatch console) or some other potential responding SU, may be a location reported by a tracking device or other locationenabled reporting device associated with the incident scene itself, may be some defined incident location automatically determined by the controller, perhaps with aid from other infrastructure components within the RAN or outside of the RAN, and/or may be determined by the controller in any of the manners set forth above with respect to FIGS. 2 and 3 above. The defined incident location may be comprised of, for example, GPS coordinates or other form of latitude and longitude coordinates. In other embodiments, Cartesian or polar coordinate systems could be used instead or in addition. In the event that the defined incident location is not based on some coordinate system, but instead is, for example, in the form of an intersection or building name, the infrastructure controller device may convert the defined incident location into a coordinate using some form of location database, or may request coordinate information from the dispatch console or the GIS, among other possibilities.

At step 504, the infrastructure controller device determines a direction of movement of a plurality of SUs relative to the defined incident location. In other words, the infrastructure controller device determines, for each of a plurality of SUs, whether the SU is moving towards the defined incident location or is moving away from the defined incident location, in any manner including those already set forth above.

At step 506, the infrastructure controller device forms a talk group including at least a first SU from the plurality of SUs determined at step 504 to be moving towards the defined incident location and not including at least a second SU from the plurality of SUs determined at step 504 to be moving away from the defined incident location. Stationary SUs may be labeled as moving towards the defined incident location or away from the defined incident location depending on system configuration and/or distance from the defined incident location, among other possibilities. Further, the infrastructure controller device may apply one or more same or different additional inclusion threshold rules for each of the SUs, as set forth above, in determining which SUs should be added to the location-based talk group.

As one example, forming a location-based talk group may include assigning a unique talk group ID to the formed group of SUs. The unique talk group ID may be stored at the infrastructure controller device, reported to a separate PTT server within or external to the same RAN within which the infrastructure controller device is located, reported to the requesting device, and/or reported to the SUs in the formed talk group. The unique talk group ID may be a reserved talk group ID that is reserved for dynamic location-based talk groups, or may be a randomly generated talk group ID that is determined to not already be in use by other SUs in the RAN.

In other embodiments, forming a location-based talk group may include assigning a particular conventional or trunked traffic channel for a talk group call, or a direct mode channel or talk-around channel for the call, and informing the requesting device and/or SUs in the formed group of the channel or channels assigned for the call.

In still further embodiments, forming a location-based talk group may include adding at least a first SU from the plurality of SUs determined at step 504 to be moving towards the defined incident location to an existing talk group and not adding at least a second SU from the plurality of SUs determined at step 504 to be moving away from the defined incident location to the existing talk group. An identifier identifying the existing talk group to which to add or not add SUs in accordance with the determinations made at step 504 may be included in the request at step 502 or in subsequent signaling transmitted to the infrastructure controller device after the request. The talk group identifier may subsequently be provided to any SUs added to the talk group.

In one additional example, forming a location-based talk group may include a step of the infrastructure controller device transmitting dispatch invitations to each of the SUs determined at step 504 to be moving towards the defined incident location, asking them to join the talk group and/or respond to the incident. The dispatch invitation may identify one or more parameters associated with the defined incident location, such as a type of incident, a location of the incident, a number of required SU responders, a number of required SU responders of a particular type, a number of SU responders that have already accepted the invitation, etc. Only those SUs transmitting a positive reply in response to the invitation are then added to the location-based talk group for responding to the incident by the infrastructure controller device and/or are further instructed to respond to the incident at the defined incident location. Other possibilities exist as well.

The formed talk group may then be used at optional step 508 in any number of additional ways by the requesting device (e.g., requesting SU or dispatcher), by any other member SU of the group, or by the dispatcher. For example, the infrastructure controller device may cause one or more of audio and data transmitted by the requesting device to be provided to the SUs in the formed talk group. In one example, the infrastructure controller device itself or a PTT server associated with the infrastructure controller device may receive audio and/or data from the requesting device destined for the SUs in the formed talk group, and may then forward, via one or more unicast, multicast, or broadcast transmissions, the received audio and/or data to the SUs in the formed talk group.

In another example, the infrastructure controller device may assign a particular repeater (conventional or trunked) or pair of repeaters to a frequency (or pair of frequencies) assigned to the formed talk group, such that the subsequent audio and/or data transmitted by the requesting device and received at the particular repeater (or one of the pair of particular repeaters) is subsequently repeated by the particular repeater (or other of the pair of particular repeaters) for receipt by the SUs in the formed talk group. In a still further example, the subsequent audio and/or data may be provided directly from the requesting device (e.g., first SU) to the SUs in the formed talk group via a direct mode transmission by the requesting device on an assigned direct mode or talk-around channel, perhaps using an assigned talk group identifier assigned by the infrastructure controller device. Finally, audio and/or data may be provided by the requesting device (e.g., the dispatch console) and routed, via the infrastructure controller device itself or via another device in the RAN under direction of the infrastructure controller device, to the SUs in the formed group via one or more repeaters assigned to the dispatch-console-sourced call.

In a still further example, the data provided to the SUs in the formed talk group may include a dispatch instruction requesting dispatch of the receiving SUs to the defined incident location and may include an identifier identifying the defined incident location, such as a street address, an intersection, a global positioning system (GPS) location, an elevation, a triangulated location, an identity (hardware address, IP address, network identifier, etc.) of a fixed wireless transmitting device (e.g., base station, access point, wireless beaconing device, other mobile station, etc.), a uniquely identified structure (such as a particular subway, train line, road, or building), a uniquely identified user or vehicle (e.g., separately tracked by the infrastructure controller device 232 by user identifier or vehicle identifier), a building floor, or some other form of unique location identifier. Additional information set forth in the data may include a type of incident occurring at the defined incident location, an identity or description of a person of interest, locations of other SU responders in the formed group, a map of the defined incident location or area surrounding the defined incident location, photos or videos associated with the foregoing, types and/or identities of other SU responders in the formed group, and ETAs of other SU responders in the formed group, among other possibilities. Other possibilities exist as well.

4. CONCLUSION

In accordance with the foregoing, an improved method and apparatus for dynamically and automatically forming location-based talk groups for responding to an incident scene as a function of SU movement relative to the defined incident location is disclosed, allowing incident and other types of response groups to be created more quickly and efficiently, and a response to an incident scene coordinated more effectively.

As a result, a more intuitive, useful, and efficient group communications system can be provided, improving communication capabilities of incidence response groups. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for dynamic talk group formation in a wireless communication system as a function of subscriber unit movement relative to a defined geographic incident location, the method comprising:
    receiving, at an infrastructure controller device from one of a second subscriber unit and a dispatch console, a request for forming a new talk group relative to a defined geographic incident location requiring a first responder response at the defined geographic incident location;
    determining, by the infrastructure controller device, a direction of movement for each of a plurality of first responder subscriber units relative to the defined geographic incident location; and
    forming, by the infrastructure controller device, a talk group including a first set of each first responder subscriber unit from the plurality of first responder subscriber units determined to have the direction of movement towards the defined geographic incident location and not including a second set of each first responder subscriber unit from the plurality of first responder subscriber units determined to not have the direction of movement towards the defined geographic incident location, the formed talk group providing for audio or data transmitted by any one first responder subscriber unit of the first set of first responder subscriber units to be provided to all other first responder subscriber units in the first set.

2. The method of claim 1, wherein the step of forming the talk group further comprises including the first responder subscriber units determined to have the direction of movement towards the defined geographic incident location responsive to determining that the first responder subscriber units also meets an additional inclusion threshold rule.

3. The method of claim 2, wherein the additional inclusion threshold rule comprises a current location of the first responder subscriber units that is within a maximum distance from the defined geographic incident location.

4. The method of claim 2, wherein the additional inclusion threshold rule comprises a type of responder of the first responder subscriber units.

5. The method of claim 2, wherein the additional inclusion threshold rule comprises an estimated time to arrive at the defined geographic incident location for the first responder subscriber units.

6. The method of claim 1, wherein determining that the first set of first responder subscriber units are moving towards the defined geographic incident location comprises tracking a plurality of prior locations for each first responder subscriber unit, determining an average cardinal direction of each first responder subscriber unit travel using the plurality of prior locations, and determining that the average cardinal direction of travel intersects a threshold area surrounding the defined geographic incident location.

7. The method of claim 6, wherein the threshold area surrounding the defined geographic incident location is a circle having a pre-configured radius distance from the defined geographic incident location.

8. The method of claim 6, wherein the threshold area surrounding the defined geographic incident location is a geo-fence defined at a dispatch console and surrounding the defined geographic incident location.

9. The method of claim 1, wherein determining that the first set of first responder subscriber units each have the direction of movement towards the defined geographic incident location comprises tracking a plurality of prior locations for each first responder subscriber unit, accessing a cartographic database of available paths and identifying a limited number of shortest or fastest paths from one of the prior locations to the defined geographic incident location, and determining from subsequent locations for each first responder subscriber unit in the first set that the first responder subscriber unit is traversing one of the limited number of shortest or fastest paths towards the defined geographic incident location.

10. The method of claim 1, further comprising tracking, by the infrastructure controller device, locations of the plurality of first responder subscriber units over time.

11. The method of claim 1, wherein the receiving the request comprises receiving, at the infrastructure controller device from the second subscriber unit, the request for forming the new talk group relative to the defined geographic incident location;
    the method further comprising causing, by the infrastructure controller device, one or more of audio and data transmitted by the second subscriber unit to be provided to first responder subscriber units in the formed talk group.

12. The method of claim 11, wherein causing the one or more of audio and data transmitted by the second subscriber unit to be provided to first responder subscriber units in the formed talk group comprises the second subscriber unit transmitting the one or more of audio and data with a formed talk group identifier associated with the formed talk group, the subscriber units in the formed talk group directly receiving the one or more of audio and data transmitted by the third subscriber unit, and the subscriber units in the formed talk group playing back the received one or more of audio and data.

13. The method of claim 11, wherein causing the one or more of audio and data transmitted by the second subscriber unit to be provided to the first responder subscriber units in the formed talk group comprises receiving the one or more of audio and data transmitted by the second subscriber unit at one of a push-to-talk (PTT) server and a repeater, and forwarding, via the one of the PTT server and the repeater, the one or more of audio and data transmitted by the second subscriber unit to the first responder subscriber units in the formed talk group.

14. The method of claim 1, further comprising causing, by the infrastructure controller device, one of an assigned talk group identifier associated with the formed talk group and a list of first responder subscriber units in the formed talk group to be provided to the one of the second subscriber unit and the dispatch console.

15. The method of claim 14, further comprising causing, by the infrastructure controller device, one of the assigned talk group identifier associated with the formed talk group and the list of first responder subscriber units in the formed talk group to be provided to each of the first responder subscriber units in the formed talk group.

16. The method of claim 1, further comprising, after forming the talk group including the first set of first responder subscriber units:
receiving further location updates of the first set of first responder subscriber units;
determining, from the further location updates, that a particular first responder subscriber unit of the first set of first responder subscriber units is no longer moving towards the defined geographic incident location; and
removing the particular first responder subscriber unit from the formed talk group.

17. The method of claim 1, wherein a first direction of movement relative to the defined geographic incident location for a first particular first responder subscriber unit in the first set is different from a second direction of movement relative to the defined geographic incident location for a second particular first responder subscriber unit in the first set.

18. An infrastructure controller device for dynamic talk group formation in a wireless communication system as a function of a subscriber unit movement relative to a defined geographic incident location, the device comprising:
a transceiver;
a data store; and
one or more processors configured to:
receive, via the transceiver, from one of a second subscriber unit and a dispatch console, a request for forming a new talk group relative to a defined geographic incident location requiring a first responder response at the defined geographic incident location;
determine a direction of movement for each of a plurality of first responder subscriber units relative to the defined geographic incident location; and
form a talk group including a first set of each first responder subscriber unit from the plurality of first responder subscriber units determined to have the direction of movement towards the defined geographic incident location and not including a second set of each first responder subscriber unit from the plurality of first responder subscriber units determined to not have the direction of movement towards the defined geographic incident location, the formed talk group providing for audio or data transmitted by any one first responder subscriber unit of the first set of first responder subscriber units to be provided to all other first responder subscriber units in the first set.

19. The infrastructure controller device of claim 18, wherein the one or more processors are further configured to cause, via the transceiver, one of an assigned talk group identifier associated with the formed talk group and a list of first responder subscriber units in the formed talk group to be provided to the one of the second subscriber unit and the dispatch console.

20. A non-transitory computer readable medium comprising computer-readable instructions that, when executed by a processing device, perform a set of functions, the set of functions comprising:
receiving, at the processing device from one of a second subscriber unit and a dispatch console, a request for forming a new talk group relative to a defined geographic incident location requiring a first responder response at the defined geographic incident location;
determining, by the processing device, a direction of movement for each of a plurality of first responder subscriber units relative to the defined geographic incident location; and
forming, by the processing device, a talk group including a first set of each first responder subscriber unit from the plurality of first responder subscriber units determined to have the direction of movement towards the defined geographic incident location and not including a second set of each first responder subscriber unit from the plurality of first responder subscriber units determined to not have the direction of movement towards the defined geographic incident location, the formed talk group providing for audio or data transmitted by any one first responder subscriber unit of the first set of first responder subscriber units to be provided to all other first responder subscriber units in the first set.

\* \* \* \* \*